US008946578B2

(12) United States Patent
Xie et al.

(10) Patent No.: US 8,946,578 B2
(45) Date of Patent: Feb. 3, 2015

(54) TOUCH PANEL AND A MANUFACTURING METHOD THEREOF (75) Inventors: Yanjun Xie, Wuhan (CN); Yau-Chen Jiang, Zhubei (TW); Limei Huang, Xiamen (CN); Shouxing Yu, Datian County (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 114 days.

(21) Appl. No.: 13/615,398

(22) Filed: Sep. 13, 2012

(65) Prior Publication Data

US 2013/0168221 A1 Jul. 4, 2013

(51) Int. Cl.
*H03K 17/975* (2006.01)

(52) U.S. Cl.
USPC .......................................................... 200/600

(58) Field of Classification Search
CPC ............... H01H 2207/026; H01H 2207/04; H01H 2207/048; H01H 2209/00; H01H 2209/024; H01H 2217/00; H01H 2219/03; H01H 2221/07; H01H 2227/036; H01H 2231/016; H03K 17/975; G06F 3/041

USPC ........... 200/600, 5 B, 46, 5 R, 5 A, 292, 243, 200/511, 512, 268, 269, 275, 262; 345/173
See application file for complete search history.

(56) References Cited

U.S. PATENT DOCUMENTS

| 8,072,429 | B2 * | 12/2011 | Grivna .......................... 345/173 |
| 2009/0184937 | A1 | 7/2009 | Grivna |
| 2010/0164889 | A1 * | 7/2010 | Hristov et al. ................ 345/173 |
| 2010/0214247 | A1 * | 8/2010 | Tang et al. .................... 345/173 |
| 2011/0102370 | A1 * | 5/2011 | Kono et al. ................... 345/174 |
| 2011/0267289 | A1 * | 11/2011 | Park et al. ..................... 345/173 |

* cited by examiner

*Primary Examiner* — Edwin A. Leon
*Assistant Examiner* — Anthony R. Jimenez
(74) *Attorney, Agent, or Firm* — Gokalp Bayramoglu (57) ABSTRACT The present disclosure relates to a touch technology, and more particularly, to a touch panel and a manufacturing method thereof. The present invention discloses a touch panel comprising a touch region, a first peripheral region at the first side of said touch region, a second peripheral region at the second side opposite to said first side, a plurality of first axial electrodes and second axial electrodes that intersect with each other diagonally to limit peripheral routing in the two peripheral regions, a plurality of peripheral first lead-wires disposed at the first peripheral region, and a plurality of second lead wares disposed at the second peripheral region. A manufacturing method of a touch panel is also provided.

16 Claims, 8 Drawing Sheets

TOUCH PANEL AND A MANUFACTURING METHOD THEREOF

This application claims the benefit of Chinese application No. 201110459035.8, filed on Dec. 29, 2011.

BACKGROUND

1. Technical Field

The present disclosure relates to a touch technology, and more particularly to a touch panel and a manufacturing method thereof.

2. Description of the Related Art

In the current consumer electronic product market, integration of touch function within a display device has become a mainstream trend for the development of portable electronic products. Touch panels are applied to many electronic products, including smart phones, mobile phones, tablet computers and notebooks. In such products, a user can operate directly through objects displayed on the screen and order instructions, wherein the touch panels serve as an interface between the user and the electronic products.

Conventional touch panel technologies usually include resistive, capacitive, and fluctuating touch technologies etc. The touch panel usually comprises a touch region, and a peripheral region surrounding the touch region. The touch region is used for generating touch signals, and a plurality of peripheral lines are disposed at interior sides of the peripheral region, which are used for transmitting the touch signals to a signal processing unit for calculation, such that the coordinates of touch positions can be determined.

Figure 1:
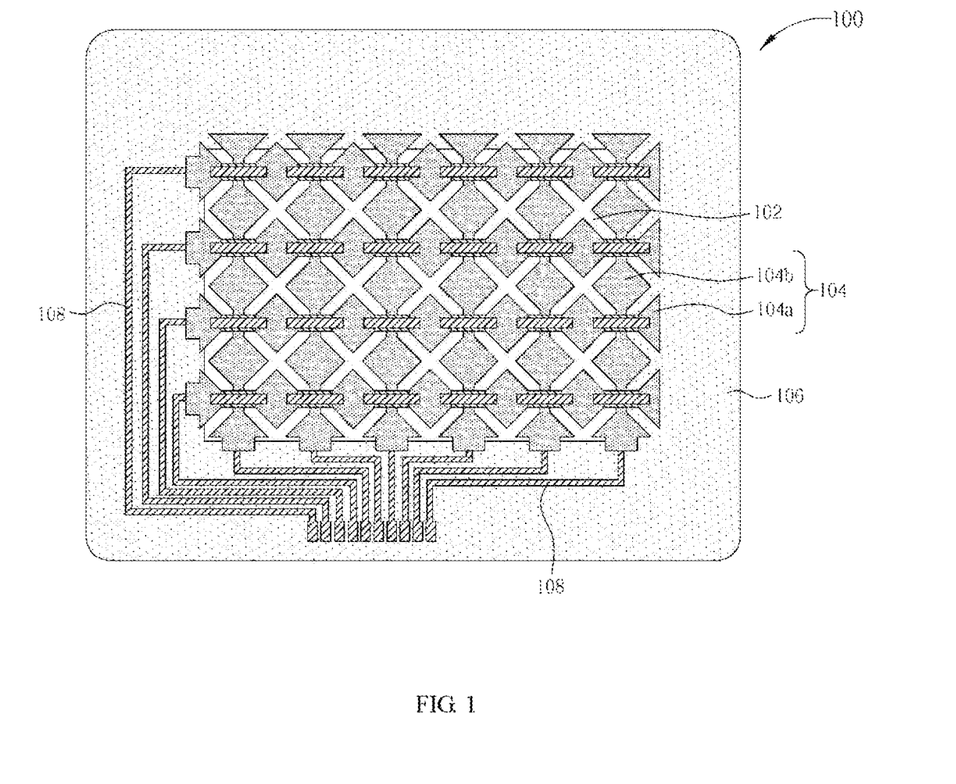
FIG. 1 is a schematic diagram of a conductive patterned structure of a touch panel in a prior art.

As for conventional designs, touch region of a touch panel comprises transparent inductive electrodes, wherein the transparent inductive electrodes comprise inductive electrodes in X direction and Y direction. FIG. 1 presents a schematic diagram of a conductive pattern structure of a conventional touch panel 100 in a prior art. As shown in FIG. 1, a conductive inductive pattern 104 is formed on a touch region 102 of a touch panel 100, which comprises a plurality of first inductive electrodes 14a in X direction and a plurality of second inductive electrodes 104b in Y direction. The conductive circuit patter 108 is formed on a peripheral region 106 of the touch panel 100 for being electrically connected, with the conductive inductive pattern 104 of the touch region so as to transmit the sensing signals generated by the inductive electrodes to the processor (not shown).

However, due to the design of the conductive inductive pattern 104 and the routing way of the conductive circuit pattern 108 in the foregoing prior art, the conductive circuit pattern 108 is electrically connected with the first inductive electrodes 104a in horizontal direction from left side of the touch region and with second inductive electrodes 104b in vertical direction from the lower side of the touch region. In the design scheme, peripheral regions of the lower side and the left side of the touch panel are required to reserve space for wiring management of the conductive circuit pattern 108, in order to prevent excessive deviation of the touch region from the central location due to reserved space. Although the peripheral regions of the upper side and the right side of the touch panel are not required for arranging the conductive circuit patterns 108, the upper side and the right side of the peripheral region space is reserved to balance location of the touch region in the central location. However, when a designer wants to reduce the size of the peripheral region of the touch panel, for example, making the available touch region maximized, the conventional touch circuit design is unable to satisfy the requirement.

As a result, the current industry is still in need of making improvement in the conductive patterns of the existing touch panel to reduce more space reserved for wiring arrangement of the conductive circuit and achieve the maximization efficiency of the touch region.

SUMMARY OF THE INVENTION

In view of the deficiencies in the foregoing prior art and the industrial demands, the present disclosure provides a touch panel. The touch panel of the present disclosure centralizes a touch region by arranging peripheral lead-wires on two opposite sides of a peripheral region surrounding the touch region by a method of adopting a design of inductive electrodes in an axis of diagonal intersecting, thereby reducing area of the peripheral region required for four sides of the previous touch region and efficiently maximizing the area of the available touch region on the touch panel.

In accordance with an embodiment of the present disclosure, a touch panel is provided having a touch region, a first peripheral region, and a second peripheral region. The touch panel comprises at least a first axial electrode and a second axial electrode that diagonally intersect with each other on the touch region, wherein the first axial electrode and the second axial electrode are mutually insulated; the first peripheral region and the second peripheral region are respectively situated on a first side and a second side opposite to the first side of the touch region; a plurality of first peripheral lead-wires disposed on the first peripheral region and electrically connected with the first axial electrodes and the second axial electrodes, and a plurality of the second peripheral lead-wires disposed on the second peripheral region and electrically connected with the first axial electrodes and the second axial electrodes.

In accordance with another embodiment, a manufacturing method of touch panel is provided. The touch panel comprises a touch region, a first peripheral region and a second peripheral region. The manufacturing method comprises: forming at least a first axial electrode and a second axial electrode that diagonally intersect with each other on the touch region, wherein the first axial electrodes and the second axial electrodes are mutually insulated and wherein the first peripheral region and the second peripheral region are respectively situated on a first side and a second side opposite to the first side; forming a plurality of the first peripheral lead-wires on the first peripheral region, and electrically connecting these lead-wires with the first axial electrodes and the second axial electrodes; and forming a plurality of the second peripheral lead-wires on the second peripheral region, and electrically connecting these lead-wires with the first axial electrodes and the second axial electrodes.

The present disclosure provides a touch panel and a manufacturing method thereof, wherein the peripheral lead-wires are concentrated on two corresponding first peripheral region and second peripheral region of the touch region by adopting the first axial electrodes and the second axial electrodes that diagonally intersect with each other, thereby reducing the peripheral region area that was required for four sides of the previous touch panel and efficiently maximizing the area of the available touch region on the touch panel.

Undoubtedly, such purposes and other purposes of the present disclosure will become more apparent to the reader after reading the following context described with detailed illustration of a more favorable embodiment with a multiple schemes and drawings.

DETAILED DESCRIPTION OF THE EMBODIMENT

Figure 2:
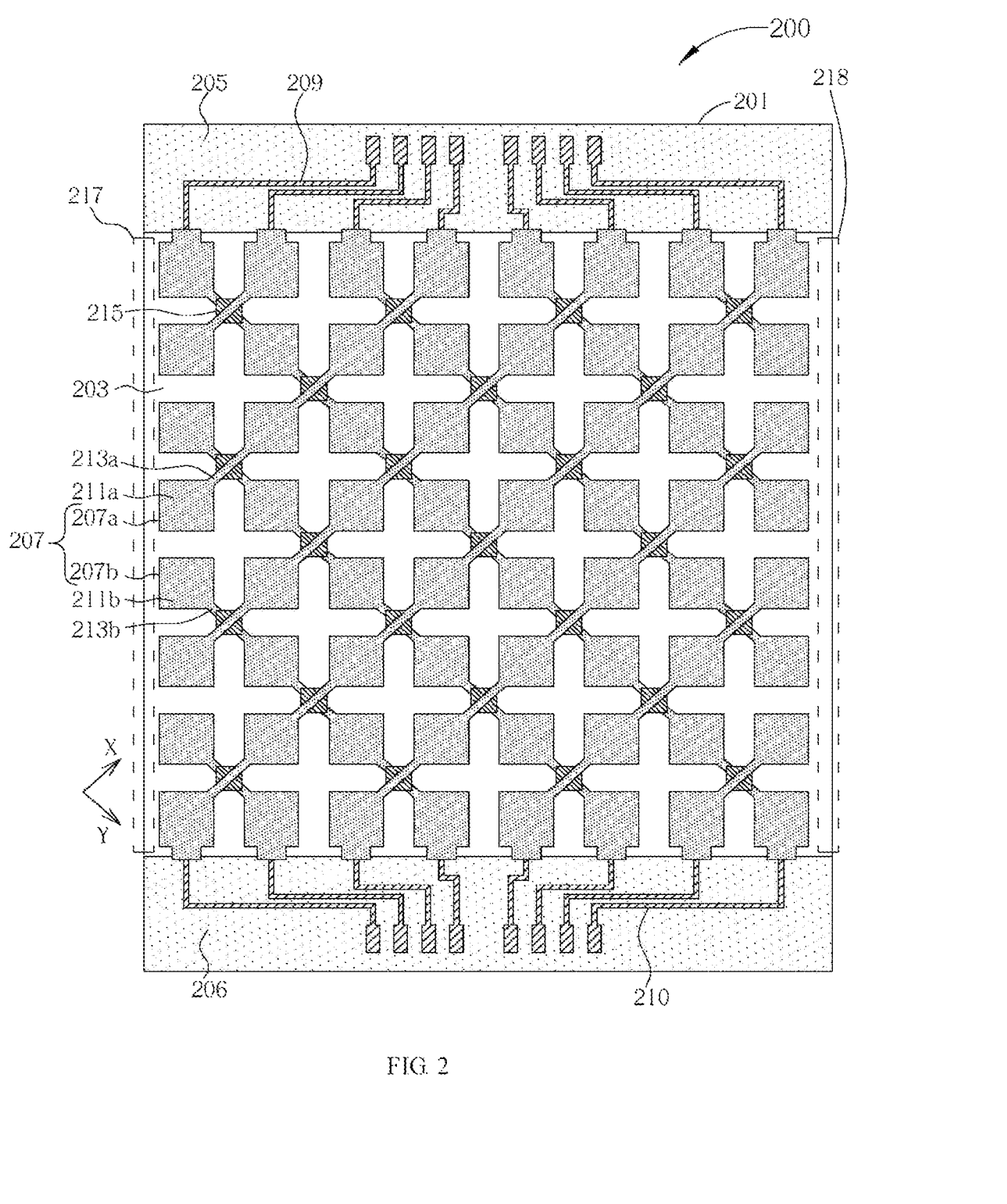
FIG. 2 is a schematic diagram of a touch panel structure in accordance with an embodiment of the present disclosure.

FIG. 2 is a structural schematic diagram of a touch panel 200 in accordance with an embodiment of the present disclosure. As shown in FIG. 2, the touch panel 200 has a touch region 203, a first peripheral region 205, and a second peripheral region 206. The touch panel 200 comprises at least a first axial electrodes 207a, at least a second axial electrodes 207b, a plurality of first peripheral lead-wires 209, and a plurality of second peripheral lead-wires 210, wherein the first axial electrodes 207a and the second axial electrodes 207b are mutually insulated from each other and diagonally intersect with each other on the touch region 203. The first peripheral lead-wires 209 are disposed on the first peripheral region 205 and electrically connected with the first axial electrodes 207a and the second axial electrodes 207b. The second peripheral lead-wires 210 are disposed on the second peripheral region 206 and electrically connected with the first axial electrodes 207a an the second axial electrodes 207b. The touch region 203 is a transparent region through which imaging lights can penetrate and on which a user can perform touch actions. The first peripheral region 205 and the second peripheral region 206 are respectively on a first side of the touch region 203 and a second side opposite to the first side, wherein the first peripheral region 205 and the second peripheral region 206 are non-transparent regions on which opaque ink can be printed so as to define the border of a touch panel and form special figures such as trademark or diagram on the said touch panel. For easy illustration, the first axial electrodes 207a and the second axial electrodes 207b in combination are called as inductive electrode array 207 in the following content.

More specifically, the inductive electrode array 207 can be capacitance-type inductive electrodes in accordance with an embodiment of the present disclosure. Each of the first axial electrodes 207a and the second axial electrodes 207b comprise a plurality of inductive units. The first axial electrodes 207a comprises a plurality of first inductive units 211a aligned along the X axis (the first axis), and a first conductive line 213a that is electrically connected with the first inductive units 211a one by one. The second axial electrodes 207b comprises a plurality of second inductive units 211b aligned along the Y axis (the second axis), and a second conductive line 213b that is electrically connected with the second inductive units 211b one by one. The first inductive its 211a of the first axial electrode 207a and the second inductive units 211b of the second electrode 207b are arranged as an array model on the touch region 203, which can generate response to touch actions of the users in the X direction and the Y direction, such as sliding, clicking and the like by converting the touch action into inductive signals.

In another embodiment of the present disclosure, the first axis X and the second axis Y of the inductive electrode array 207 can be in two diagonal directions and can be favorable to operate particularly when they are mutually perpendicular to each other. The first axial electrodes 207a and the second axial electrodes 207b are disposed on the touch region 203 in the intersecting alignment, while the first conductive line 213a connected to the various first inductive units 211a and the second conductive line 213b connected to the various second inductive units 211 are overlapping and interlacing with each other. In order to prevent the overlapped and interlaced first conductive lines 213a and second conductive lines 213b from contacting and to make the first axial electrodes 207a and the second axial electrodes 207b electrically connected, the touch panel 200 further comprises a plurality of insulating objects 215 disposed between each overlapped and interlaced first conductive line 213a and second conductive line 213b. Therefore, each one of the first conductive line 213a and the second conductive line 213b are intersected and overlapped on each other through the insulating object 215. The insulating object 215 can include a multi-layer polyester film of high transmittance or inorganic material so that the demand of electrical insulation between the first axial electrode 207a and the second axial electrode 207b, and high transmittance can be satisfied simultaneously.

In the foregoing embodiment, the first conductive line 213a and the first inductive unit 211a are formed by integration. The second conductive line 213b and the second inductive unit 211b are formed by integration, i.e., the first conductive line 213a and the first inductive unit 211a are formed by integration in the same manufacturing process, while the second conductive line 213b and the second inductive unit 211b are formed by integration in the same manufacturing process.

However, the first conductive line 213a and the second conductive line 213b can be separated from their corresponding inductive units to be fabricated in accordance with other embodiments of the present disclosure.

Figure 3:
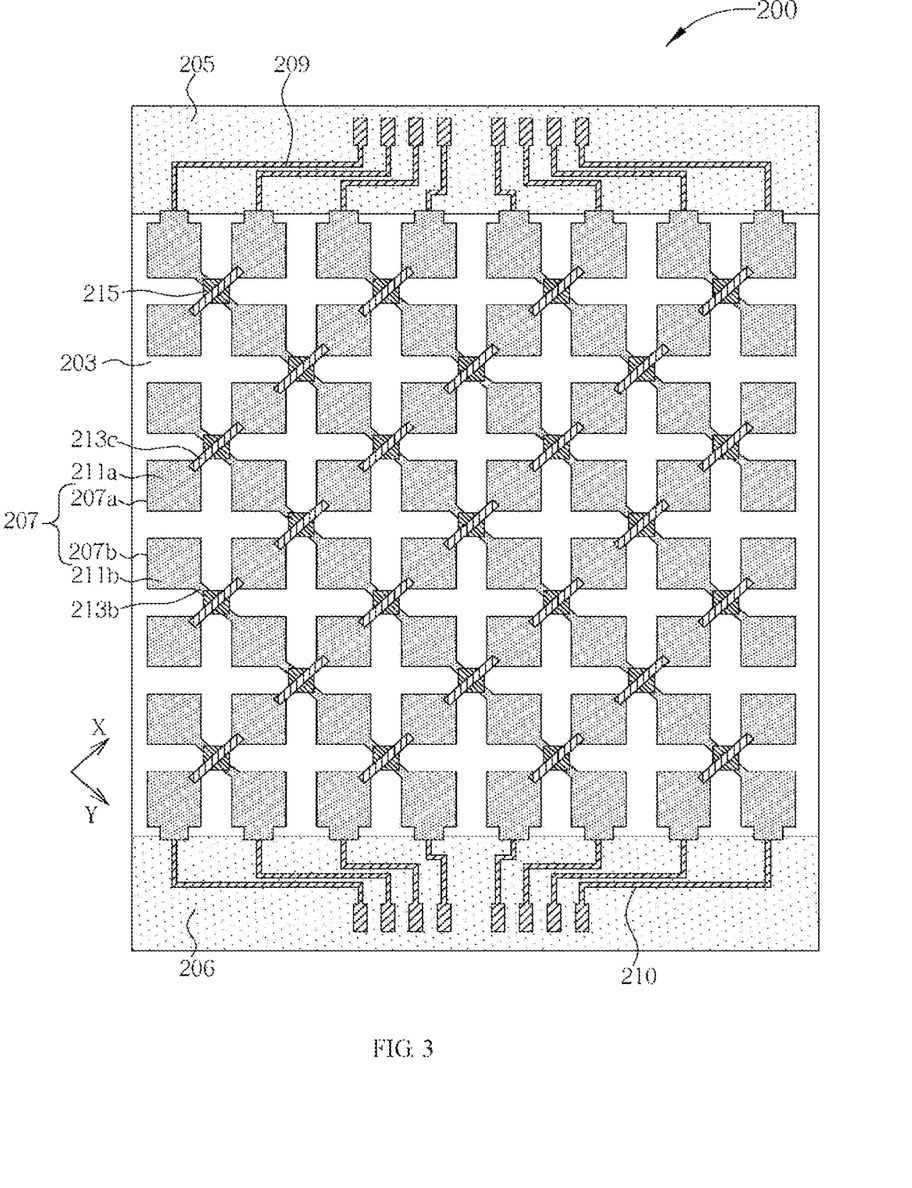
FIG. 3 is a schematic diagram of a touch panel structure in accordance with another embodiment of the present disclosure.

FIG. 3 is a structural schematic diagram of a touch panel 200 in accordance with another embodiment of the present disclosure. The distinction between the present embodiment and the foregoing embodiment is that any one of a first conductive line 213a and a second conductive line 213b can be separated from their respectively connected inductive units to be fabricated. As shown in FIG. 3, a first conductive line 213c connected to the various first inductive units 211a on the first axial electrode 207a is made of a material different from the first inductive unit 211a, wherein the first inductive unit 211a is made of material of, but not limited to non-transparent metallic materials such as gold, silver, copper, aluminum or molybdenum.

In such an embodiment, the first inductive unit 211a and the first conductive line 213c are formed independently, while the second conductive line 213 and the second inductive unit 211b are formed by integration, wherein the first conductive line 213c (also called jumper line) is non-transparent crosses on each insulating object 215, and is electrically connected with the various first inductive units 211a on the first axial electrode 207a.

On the other hand, first peripheral lead-wires 209 and second peripheral lead-wires 210 are used for transmitting inductive signals generated by an inductive electrode array 207. In an embodiment of the present disclosure, the first peripheral lead-wires 209 are disposed on the first peripheral region 205 of one side of the touch region 203, and the second peripheral lead-wires 210 are disposed on the second peripheral region 206 opposite to the first peripheral region 205 of the touch region 203. Each of the first peripheral lead-wire 209 is correspondingly and electrically connected with the first inductive unit 211a and the second inductive unit 211b, which are close to the first peripheral region 205 respectively. Each of the second peripheral lead-wire 210 is correspondingly and electrically connected with the first inductive unit 211a and the second inductive unit 211b, which are close to the second peripheral region 206 respectively. The peripheral lead-w as 209 and 210 can be electrically connected with an IC mainboard or a LCD softboard by a flexible bonding way. Moreover, each first axial electrode 207a or each second axial electrode 207b can be at least electrically connected with a first peripheral lead wire 209 in the first peripheral region 205 on one side of the touch region 203 or with a second peripheral lead-wire 210 in the second peripheral region 206 on the other side of the touch region 203.

In another embodiment, a touch panel 200 can further comprise a third peripheral region 217 and a fourth peripheral region 218, except for a first peripheral region 205 and a second peripheral region 206, wherein the third peripheral region 217 and the fourth peripheral region 218 are respectively situated on a third side (such as the left side) of the touch region 203 and a fourth side (such as the right side) opposite to the third side, wherein no peripheral lead-wire is disposed on the third peripheral region 217 or the fourth peripheral region 218. Thus, the space previously required to reserve for placing the peripheral lead-wires can be saved.

Figure 4:
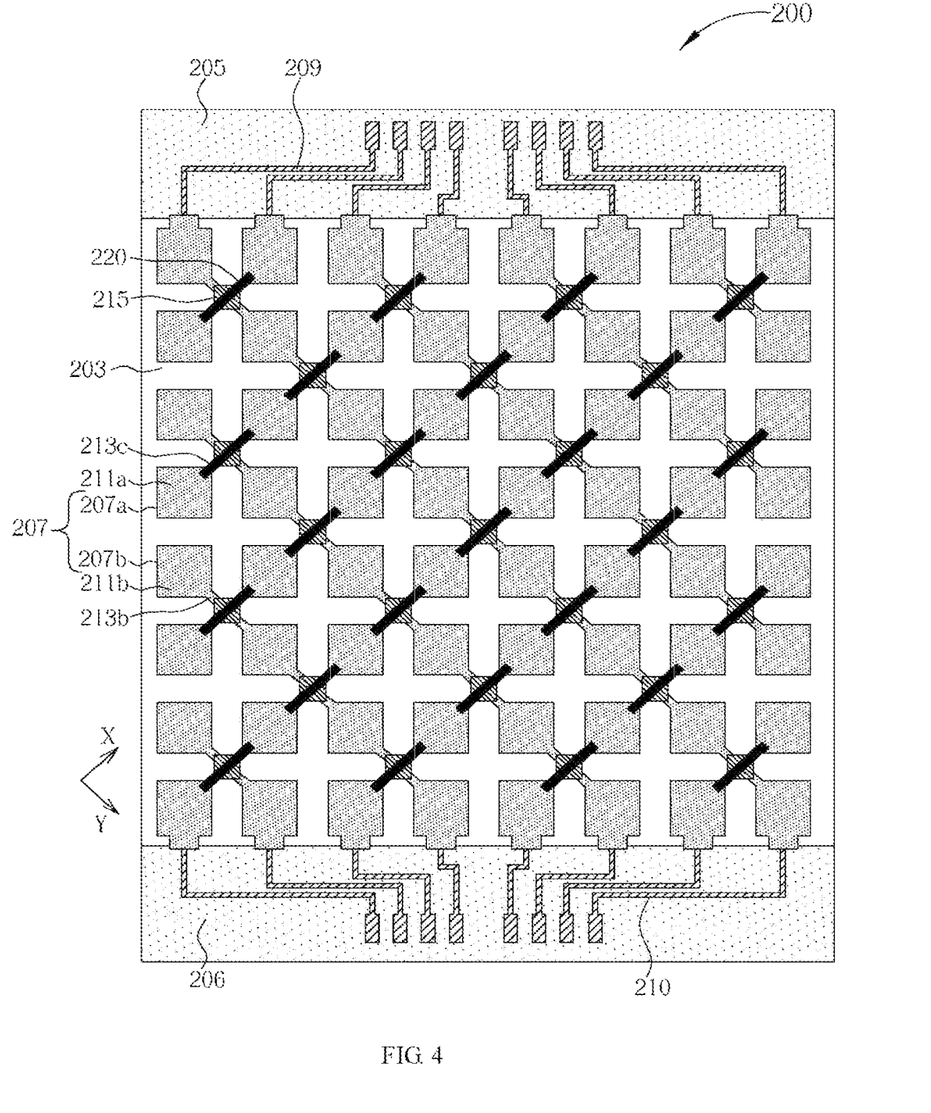
FIG. 4 is a further embodiment concerning the touch panel of FIG. 3.

FIG. 4 shows another embodiment for a touch panel structure described in FIG. 3. In the touch panel structure of the foregoing embodiment described in FIG. 3, the first conductive line 213c connected to the various inductive units is made of non-transparent material so that it can be easily visible for the users on the appearance of the touch panel 200. Therefore, a touch panel 200 in a touch panel stricture of FIG. 4 comprises a black matrix layer 220 disposed on each non-transparent first conductive line 213c to shield the first conductive line 213c of high reflectivity and minimize the visibility of the first conductive line 213c for naked eyes. Other components of the embodiment are the same as the embodiment shown in FIG. 3, which thereby are not described herein again.

Figure 5:
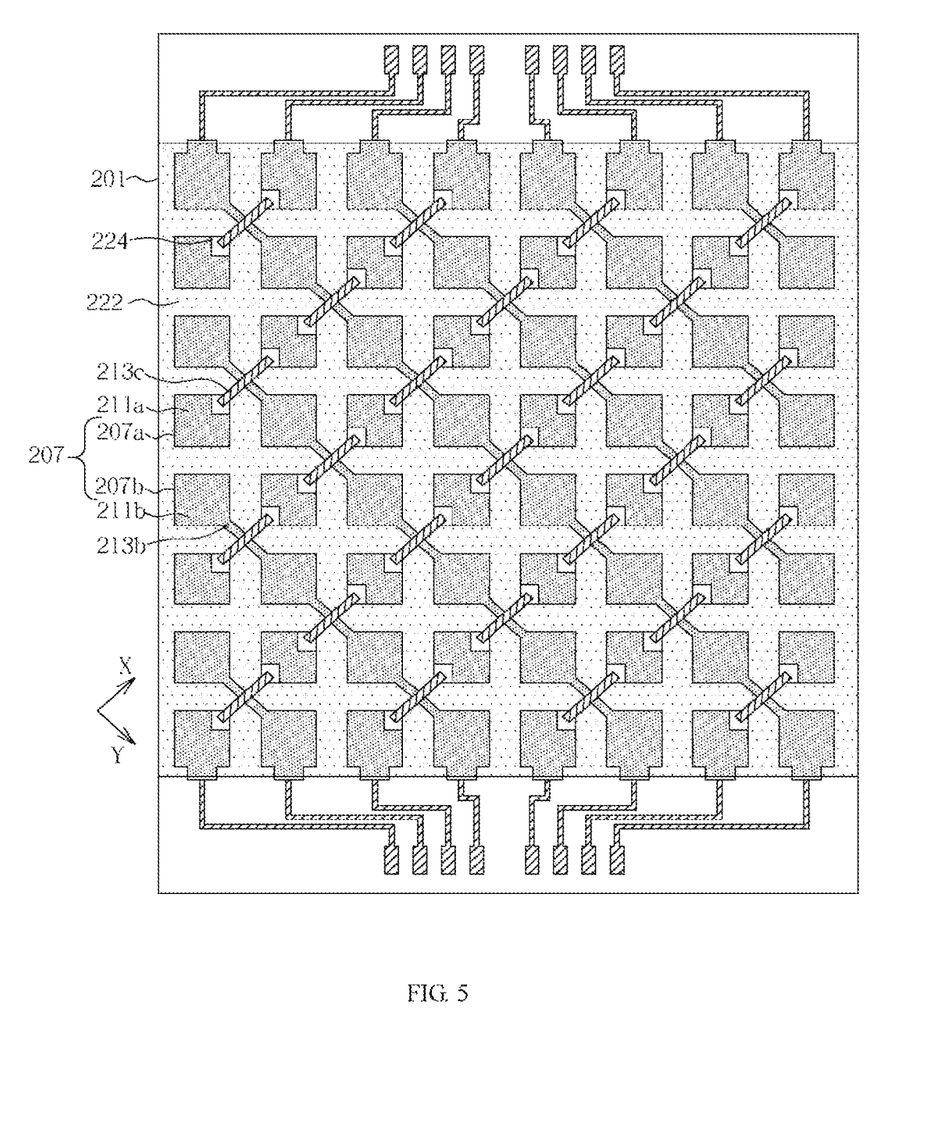
FIG. 5 is a schematic diagram of a touch panel structure in accordance with another embodiment of the present disclosure.

FIG. 5 is a structural schematic diagram of a touch panel in accordance with another embodiment. As shown in FIG. 5, the distinction between the touch panel structures in FIG. 5 and in FIG. 3 is that an insulating object 215 for electrically insulating a first conductive line 213c with a second conductive line 213b is replaced by an insulating layer 222.

In such an embodiment, the insulating layer 222 covers first inductive units 211a, second inductive units 211, and the second conductive lines 213b for being applied to electrical insulation between subsequent interlaced first axial electrode 207a and second axial electrode 207b. The predetermined position of the insulating layer 222 has an opening 224 to expose the first inductive unit 211a of the lower layer in order to make the independently separated first inductive units 211a electrically connected with each other. Therefore the first conductive line 213c on the corresponding position of the insulating layer 222 can pass through the openings 224 and can be isolated by the insulating layer 222 to make the adjacently situated first inductive units 211a on the lower layer electrically connected. A black matrix layer (not shown) can be additionally disposed on the first conductive line 213c as described in the embodiment of FIG. 4 to lower the visibility of the first conductive line 213c, if the first conductive line 213c of the present embodiment is made of non-transparent material.

In the foregoing embodiment, the touch panel 200 can also comprise a protective layer (not shown) covering an inductive electrode array 207 first peripheral lead-wires 209, and second peripheral lead-wires 210, with the purpose of preventing various components or conductive patterns in a touch region 203 and a peripheral region 205 from chemical corrosion or physical damages. The material of the protective layer can include inorganic materials such as silicon nitride, silicon oxide, and silicon oxynitride, or organic materials such as acrylic resin or other suitable materials, but is not limited to.

Incidentally materials of the first inductive unit 211a, the second inductive unit 211b, the first conductive line 213a, the second conductive line 213b, the first peripheral lead-wires 209, and the second peripheral lead-wires 210 in accordance with the embodiment provided in the present disclosure can be transparent conductive materials such as ITO, IZO and AZO, but not limited thereto. The materials of the first conductive lines 213a, the first peripheral lead-wires 209 and the second peripheral lead-wires 210 can also be non-transparent materials such as metals possessing conductive property. Moreover the touch panel further comprises a substrate 201 on the surface of which the foregoing touch region 203, the first peripheral region 205 and the second peripheral region 206 opposite to the first peripheral region 205 are contained. The substrate 201 is made of a transparent material such as, but not limited to transparent silica glass or PMMA.

The touch panel 200 provided in the embodiment of the present disclosure can be manufactured by the following procedure.

Figure 6:
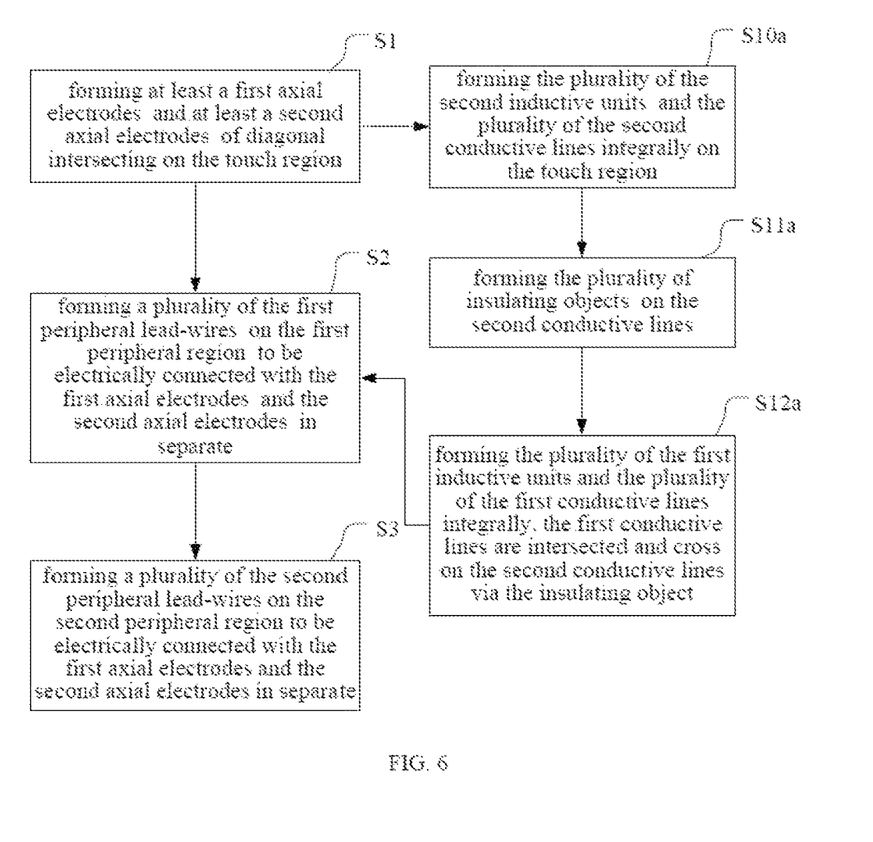
FIG. 6 is a flow chart of a manufacturing method for a touch panel in accordance with an embodiment of the present disclosure.

FIG. 6 is a flow chart of a manufacturing method for a touch panel in accordance with an embodiment of the present disclosure. As shown in FIG. 6, the manufacturing method for touch panel in the present disclosure comprises: Step S1: forming at least a first axial electrodes 207a and at least a second axial electrodes 207b that diagonally intersect with each other on the touch region 203, wherein the first axial electrode 207a and the second axial electrode 207b are mutually insulated, while a first peripheral region 205 and a second peripheral region 206 are respectively situated on a first side and a second side opposite to the first side with regard to the touch region 203. Step S2: forming a plurality of first peripheral lead-wires 213a on the first peripheral region 205 to be electrically connected with the first axial electrodes 207a and second axial electrodes 207b in separate. Step S3: forming a plurality of the second peripheral lead-wires on the second peripheral region to be electrically connected with the first axial electrodes and the second axial electrodes in separate. In a specific embodiment, Step S2 and Step S3 can be finished in the same step of printing or photoetching process.

Specifically, as for the structures of different touch panels provided in the embodiment of the present disclosure, Steps S1 in the manufacturing method for the foregoing touch panels are also different. The following content will illustrate the detailed procedures of Steps S1 corresponding to different touch panel structures.

Relative to a manufacturing method for the touch panel 200 in the embodiment shown in FIG. 2, please refer to FIG. 6 again. The foregoing Step S1 specifically comprises: Step S10a: forming a plurality of second inductive units 211b and a plurality of second conductive lines 213b integrally on a touch region 203, which are aligned and disposed along the second axis (such as the Y axis), wherein the second inductive units 211b are electrically connected with each other via the second conductive lines 213b. Subsequently, Step S11a:

forming a plurality of insulating objects 215 on the second conductive lines 213b. Then, Step S12a: forming the plurality of first inductive units 211 and the plurality of first conductive lines 213a integrally, which are aligned and disposed along the first axis (such as the X axis), wherein the first inductive units 211a are electrically connected with each other via a first conductive line 213a, and the first conductive lines 213a are intersected and cross on the second conductive lines 213b via the insulating object 215. The first conductive lines 213a and the second conductive lines 213b are formed by being integrated with the inductive units, i.e., the first conductive lines 213a and the first inductive units 211a are made by the same manufacturing process, while the second conductive lines 213b and the second inductive units 211b are made by the same manufacturing process. The materials for conductive lines and inductive units can be transparent conductive materials such as ITO, IZO, and AZO. The foregoing manufacturing process can include electroplating, etching screen-printing or other manufacturing processes capable of reaching the equivalent efficiency.

Figure 7:
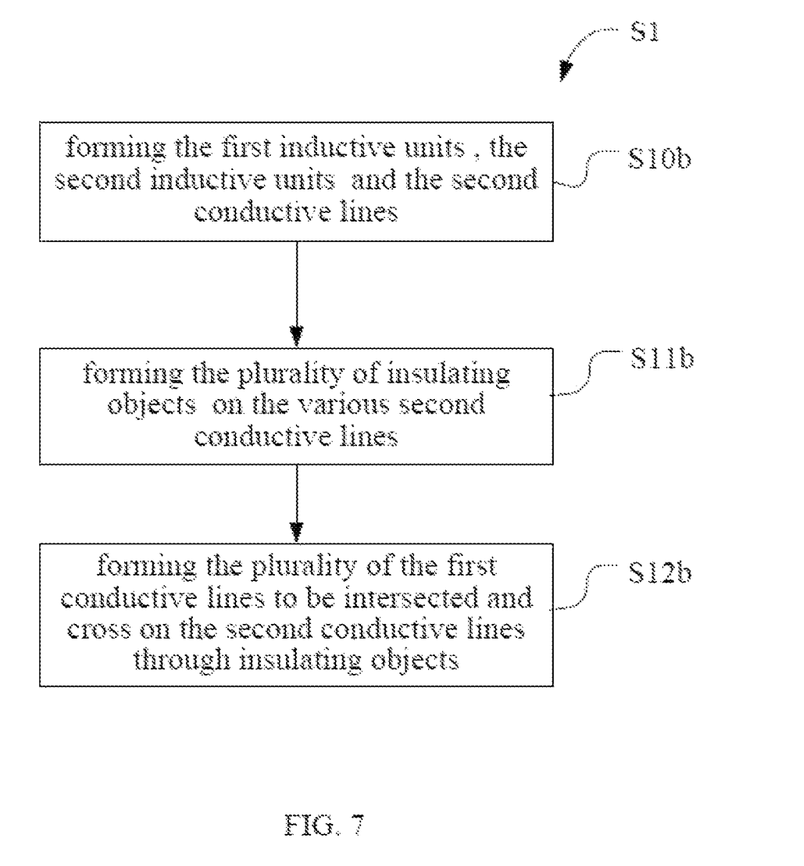
FIG. 7 is Step S1 of the manufacturing method for a touch panel in accordance with another embodiment of the present disclosure.

FIG. 7 is Step S1 in a manufacturing method for a touch panel provided in another embodiment of the present disclosure, which corresponds to the structure of the touch panel as shown in FIG. 3. In the present embodiment, Step S1 specifically comprises. Step S10b: firstly, forming first inductive units 211a, second inductive units 21b and the second conductive lines 213b. The second conductive lines 213b are electrically connected with the corresponding second inductive units 211b, i.e., the second inductive units 211b and the corresponding second conductive lines 213b are formed by integration, and at this time the various first inductive units 211a have not yet been connected with the first conductive lines 213c. Next, Step S11b: forming plurality of insulating objects 215 on the various second conductive lines 213b. Then, Step S12b: forming a plurality of first conductive lines 213a to be intersected and that cross on the second conductive lines 213b through insulating objects 215, and are electrically connected with the various first inductive units 211a. In a specific embodiment, when materials used for the first conductive lines are same as materials for the first peripheral lead-wires 209 and the second peripheral lead-wires 210, such as metallic materials, Step S12b for forming the plurality of the first conductive lines 213a, Step S2 for forming the first peripheral lead-wires 209, and Step S3 for forming the second peripheral lead-wires 210 are finished at the same time, i.e., finished by the same step of printing and etching or other manufacturing processes capable of reaching the equivalent efficiency.

Figure 8:
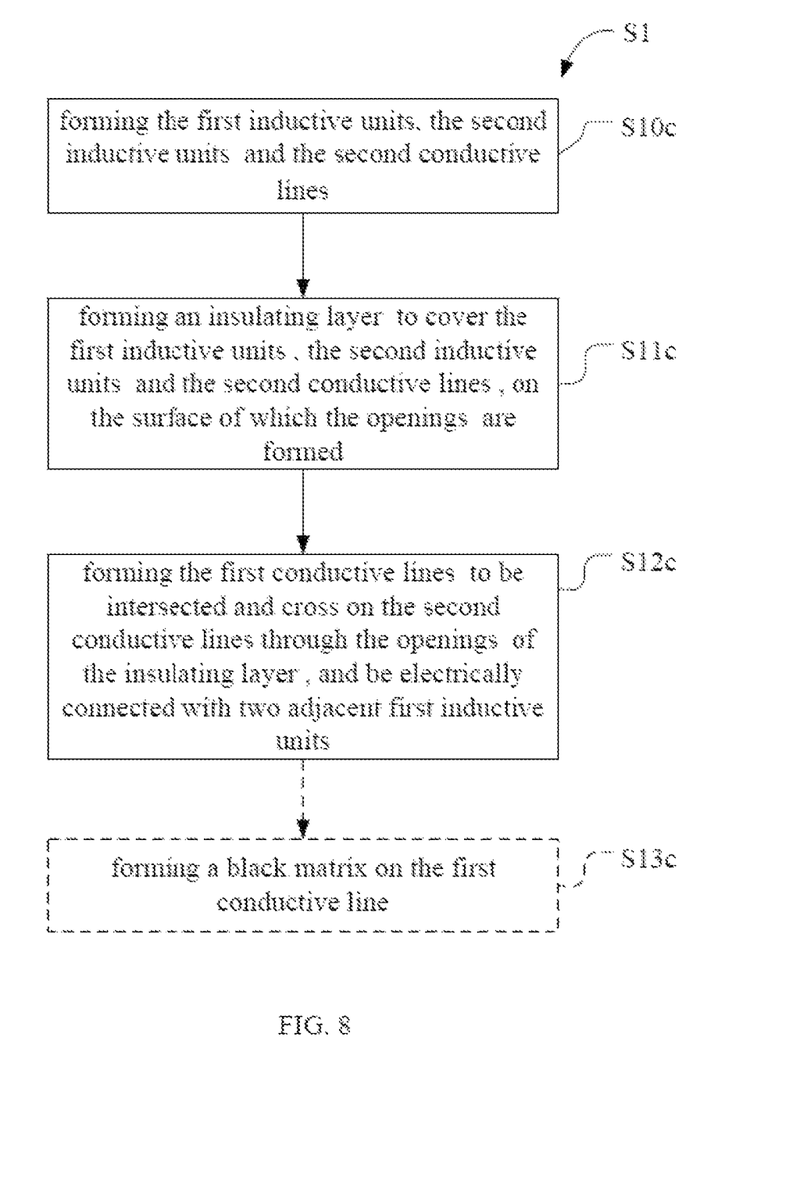
FIG. 8 is Step S1 of the manufacturing method for a touch panel in accordance with another embodiment of the present disclosure.

Referring to FIG. 5 and FIG. 8 in combination. FIG. 8 is a Step S1 in a manufacturing method for a touch panel provided in another embodiment of the present disclosure described in FIG. 5. As shown FIG. 8, Step S1 in accordance with the embodiment specifically comprises: Step S10c: firstly, forming first inductive units 211a second inductive units 211b, and second conductive lines 213b, wherein the second inductive units 211b are electrically connected with each other via the second conductive lines 213b, i.e., the second inductive units 211b and the corresponding second conductive lines 213b are formed by integration, whereas the various first inductive units 211a are independently separated. Next, Step S11c comprises forming an insulating layer 222 to cover the first inductive units 211a, the second inductive units 211b, and the second conductive lines 213b, on the surface of which the openings 224 are formed. Then, Step S12c comprises forming the first conductive lines 213c to be intersected and crossed on the second conductive lines 213b through the openings 224 of the insulating layer 222, and configured to electrically connect two adjacent first inductive units 211a.

In the foregoing embodiment, materials for the first conductive lines 213c can be transparent or non-transparent conductive materials. When non-transparent conductive materials are adopted for the first conductive lines 213c such as metallic materials, the first conductive lines are easy for the user's naked eyes to see from the appearance of the touch panel. Therefore, to reduce the visibility, the foregoing embodiment can further comprise Step S13c: forming a black matrix 220 on the first conductive line 213c so as to reduce the visibility. Therefore, the non-transparent first conductive lines 213c are not relatively easy to see from outside of the touch panel. The black matrix layer 220 can be a film of black photo-resistance, black inks or with low reflectivity. When black inks are adopted for making black matrix layers, the manufacturing process can be finished at the same time with the fabrication of the black masks shielding the conductive circuits.

Summarized from the above, the touch panel of the present disclosure and its manufacturing method are provided, in which the peripheral lead-wires are centralized on the peripheral regions of two opposite sides of the touch panel (such as the upper and lower sides) by adopting the design of inductive electrodes in an axis of diagonal intersection. Particularly, the first peripheral region and the second peripheral region defined in the foregoing embodiment are generally shielding regions on which special patterns such as trademarks or figures are formed previously. Thus the peripheral lead-wires in the present disclosure are devised integrally on these common regions, thereby reducing the border area previously required for four sides of the touch region and efficiently improving the areas of available touch regions on the touch panel.

While certain embodiment have been shown and described, various modifications and substitutions may be made thereto without departing from the spirit and scope of the disclosure. Therefore, it is to be understood that the present disclosure has been described by way of illustration and not limitations.

What is claimed is:

1. A touch panel having a touch region, a first peripheral region, a second peripheral region, a third peripheral region and a fourth peripheral region, wherein the touch panel comprises:

at least one first axial electrode and at least one second axial electrode that diagonally intersect with each other on the touch region, wherein the first axial electrodes and the second axial electrodes are mutually insulated, and wherein the first peripheral region and the second peripheral region are respectively situated on a first side and a second side opposite to the first side of the touch region;

a plurality of the first peripheral lead-wires disposed on the first peripheral region and electrically connected with the first axial electrodes and the second axial electrodes; and a plurality of the second peripheral lead-wires disposed on the second peripheral region and electrically connected with the first axial electrodes and the second axial electrodes;

wherein the third peripheral region and the fourth peripheral region are respectively situated on a third side and a fourth side opposite to the third side of the touch region, further wherein the peripheral lead-wires are not disposed on the third peripheral region and the fourth peripheral region.

2. The touch panel of claim 1, wherein the first axial electrode comprises a plurality of first inductive units aligned and disposed along a first axis and electrically connected with each other via a first conductive line, and wherein the second axial electrode comprises a plurality of second inductive units aligned and disposed along a second axis, and electrically connected with each other via a second conductive line, further wherein the first axis and the second axis are respectively two diagonal directions of the touch region.

3. The touch panel of claim 2, further comprising a plurality of insulating objects disposed between the first conductive lines and the second conductive lines, wherein the first conductive lines are intersected and cross on the second conductive lines via the insulating objects.

4. The touch panel of claim 2, further comprising an insulating layer covering the first inductive units, the second inductive units, and the second conductive lines, wherein a plurality of openings are formed on the insulating layer, and wherein the first conductive lines intersect and cross the second conductive lines through openings of the insulating layer, and wherein the first conductive lines electrically connect with two adjacent first inductive units.

5. The touch panel of claim 2, wherein the first conductive lines and the first inductive units are formed by integration, while the second conductive lines and the second inductive units are formed by integration.

6. The touch panel of claim 2, wherein the first conductive lines are made of metallic materials, and wherein the first inductive units and the first conductive lines are formed independently, and wherein the second conductive lines and the second inductive units are formed by integration.

7. The touch panel of claim 6, wherein a black matrix layer is further disposed on each first conductive line.

8. The touch panel of claim 2, wherein the first peripheral lead-wires electrically connect with the first inductive units and the second inductive units close to the first peripheral region, and wherein the second peripheral lead-wares electrically connect with the first inductive units and the second inductive units close to the second peripheral region.

9. A manufacturing method of a touch panel comprising a touch region, a first peripheral region, a second peripheral region, a third peripheral region and a fourth peripheral region, said method comprising the steps of:
forming at least one first axial electrode and at least one second axial electrode diagonally intersecting with each other, wherein the first axial electrode and the second axial electrode are mutually insulated, and wherein the first peripheral region and the second peripheral region are respectively situated on a first side and a second side opposite to the first side;
forming a plurality of the first peripheral lead-wires on the first peripheral region to be electrically connected with the first axial electrodes and the second axial electrodes; and
forming a plurality of the second peripheral lead-wires on the second peripheral region to be electrically connected with the first axial electrodes and the second axial electrodes;
wherein the third peripheral region and the fourth peripheral region are respectively situated on a third side and a fourth side opposite to the third side of the touch region, further wherein the peripheral lead-wires are not disposed on the third peripheral region and the fourth peripheral region.

10. The manufacturing method of the touch panel of claim 9, wherein the first axial electrode comprises a plurality of first inductive units aligned and disposed along a first axis, and electrically connected with each other via a first conductive line, and wherein the second axial electrode comprises a plurality of second inductive units aligned and disposed along a second axis, and electrically connected with each other via a second conductive line, and wherein the first axis and the second axis are respectively two diagonal directions of the touch region.

11. The manufacturing method of the touch panel of claim 10, wherein the step of forming the first axial electrode and the second axial electrode further comprises:
forming the second inductive units and the second conductive lines integrally on the touch region;
forming a plurality of insulating objects on the second conductive lines; and
forming the first inductive units and the first conductive lines integrally on the touch region, wherein the first conductive lines intersect and cross on the second conductive lines via the insulating objects, and wherein the first conductive lines are electrically connected with two adjacent first inductive units.

12. The manufacturing method of the touch panel of claim 10, wherein the step of forming the first axial electrode and the second axial electrode further comprises:
forming the first inductive units, the second inductive units and the second conductive lines, wherein the second inductive units and the second conductive lines are formed integrally;
forming a plurality of the second insulating objects on the second conductive lines; and
forming the first conductive lines that intersect and cross on the second conductive lines via the insulating objects, and wherein the first conductive lines electrically connect with two adjacent first inductive units.

13. The manufacturing method of the touch panel of claim 12, wherein the step of forming the first conductive lines and the step of forming the first peripheral lead-wires and the second peripheral lead-wires are finished at same time.

14. The manufacturing method of the touch panel of claim 10, wherein the step of forming the first axial electrode and the second axial electrode further comprises:
forming the first inductive units, the second inductive units, and the second conductive lines, wherein the second inductive units and the second conductive lines are formed integrally;
forming an insulating layer on the first inductive unit, the second inductive unit and the second conductive lines;
forming a plurality of openings on the insulating layer; and
forming the first conductive lines that intersect and cross on the second conductive lines through the openings of the insulating layer, and wherein the first conductive lines electrically connect with two adjacent first inductive units.

15. The manufacturing method of the touch panel of claim 10, wherein the first conductive lines are made of metallic materials, and said method further comprises the step of forming a black matrix layer on each first conductive line.

16. The manufacturing method of the touch panel of claim 10, wherein the first peripheral lead-wires are electrically connected with the first inductive units and the second inductive units close to the first peripheral region, and wherein the second peripheral lead-wires are electrically connected with the first inductive units and the second inductive units close to the second side of the second peripheral region.

* * * * *